(12) United States Patent
Min et al.

(10) Patent No.: US 10,502,886 B2
(45) Date of Patent: Dec. 10, 2019

(54) REFLECTIVE POLARIZING MODULE HAVING DIFFUSION PATTERN AND BACKLIGHT UNIT INCLUDING SAME

(71) Applicant: LMS CO.,LTD, Pyeongtaek-si, Gyeonggi-do (KR)

(72) Inventors: Jee Hong Min, Seongnam-si (KR); Eun Mi Lee, Suwon-si (KR)

(73) Assignee: LMS CO., LTD, Pyeongtaek-si, Gyeonggi-Do (KR)

( * ) Notice: Subject to any disclaimer, the term of this patent is extended or adjusted under 35 U.S.C. 154(b) by 175 days.

(21) Appl. No.: 15/578,919

(22) PCT Filed: May 21, 2016

(86) PCT No.: PCT/KR2016/005413
§ 371 (c)(1),
(2) Date: Dec. 1, 2017

(87) PCT Pub. No.: WO2016/195300
PCT Pub. Date: Dec. 8, 2016

(65) Prior Publication Data
US 2018/0172897 A1 Jun. 21, 2018

(30) Foreign Application Priority Data
Jun. 4, 2015 (KR) .................. 10-2015-0079172

(51) Int. Cl.
*F21V 8/00* (2006.01)
*G02B 27/28* (2006.01)
(Continued)

(52) U.S. Cl.
CPC .......... *G02B 6/0056* (2013.01); *G02B 5/0221* (2013.01); *G02B 5/0231* (2013.01);
(Continued)

(58) Field of Classification Search
CPC ........ G02B 5/02; G02B 5/045; G02B 6/0051; G02B 6/0053; G02B 6/0056;
(Continued)

(56) References Cited

U.S. PATENT DOCUMENTS

2004/0228106 A1* 11/2004 Stevenson ............... G02B 5/045
362/627
2010/0027294 A1* 2/2010 Lee .......................... G02B 5/02
362/620
2010/0165241 A1 7/2010 Kim et al.

FOREIGN PATENT DOCUMENTS

KR 10-2008-0060406 A 7/2008
KR 10-2010-0057483 A 5/2010
(Continued)

*Primary Examiner* — Anh T Mai
*Assistant Examiner* — Steven Y Horikoshi
(74) *Attorney, Agent, or Firm* — Novick, Kim & Lee, PLLC; Jae Youn Kim

(57) ABSTRACT

A reflective polarizing module is provided which includes a reflective polarizing sheet to selectively transmit light; a light-condensing sheet having continuously repeating light-condensing bodies, wherein each of the light-condensing bodies has a gradually decreasing transverse cross-sectional area from the lower portion to the upper portion of the reflective polarizing sheet, and the upper end of the first unit light-condensing body is bonded to the lower portion of the reflective polarizing sheet so as to have a first transverse width; and a coating layer on the upper surface of the reflective polarizing sheet and having a diffusion pattern to diffuse light transmitted through the reflective polarizing sheet, the diffusion pattern being constituted by a plurality of diffusion protrusions protruding from the upper surface of the coating layer, wherein at least some of the plurality of diffusion protrusions are formed to have a transverse width relatively smaller than the first transverse width.

8 Claims, 6 Drawing Sheets

(51) Int. Cl.
*G02B 5/02* (2006.01)
*G02F 1/1335* (2006.01)
(52) U.S. Cl.
CPC ......... *G02B 6/0051* (2013.01); *G02B 6/0053* (2013.01); *G02B 6/0055* (2013.01); *G02B 27/28* (2013.01); *G02F 1/13362* (2013.01)
(58) Field of Classification Search
CPC ... G02F 2001/133507; G02F 1/133504; G02F 1/13362
See application file for complete search history.

(56) References Cited

FOREIGN PATENT DOCUMENTS

| KR | 10-2014-0084790 A | 7/2014 |
| KR | 10-2015-0051258 A | 5/2015 |

\* cited by examiner

REFLECTIVE POLARIZING MODULE HAVING DIFFUSION PATTERN AND BACKLIGHT UNIT INCLUDING SAME

TECHNICAL FIELD

The present invention relates to a reflective polarizing module having a diffusing pattern and a backlight unit having the same, and more particularly, to a reflective polarizing module having a reflective polarizing sheet for transmitting only light of a specific polarization so as to diffuse a condensed light when a coating layer having a separate diffusion pattern is provided on the reflective polarizing sheet, and a backlight unit having the same.

BACKGROUND ART

In recent years, a flat panel display has been widely used. A representative example of the flat panel display is a liquid crystal display.

Generally, the liquid crystal display (LCD) requires a backlight unit that provides uniform light throughout a screen, unlike a conventional CRT.

Specifically, the backlight unit is configured to provide uniform light from a rear surface of the liquid crystal display, in which a light source LED is disposed on one side of a light guide plate, and the light guide plate is provided with a reflector on a lower surface thereof so as to transmit a light emitted from the light source upwardly.

In this state, the light generated by the light source is transmitted upwardly by the light guide plate and the reflector, and the light transmitted to the upper portion is uniformly moved upwardly through a light-condensing sheet.

At the same time, a separate reflective polarizing sheet is provided on the upper portion of the light-condensing sheet to transmit only the light of a specific polarization upwardly, thereby transmitting the light that has been stably condensed to the outside.

As the light-condensing sheet, a sheet having a general prism may be applied.

In addition, when a separate reflective polarizing sheet is provided on the upper portion of the light-condensing sheet, the brightness of the liquid crystal display can be increased.

As described above, in the backlight unit, a light generated from the light source provided on the side is transmitted upwardly by the light guide plate and the reflector, and the light transmitted upwardly is uniformly condensed through the light-condensing sheet.

On the other hand, in the case where a reflective polarizing sheet is provided in the backlight unit, since the brightness of the liquid crystal display can be raised, it is widely used. However, when the light-condensing sheet having a plurality of prisms is bonded to the reflective polarizing sheet, an upper end portion of the prism having an inclined plane forms a bonding surface and is eliminated.

Thus, the upper end portion of the prism is eliminated, and the bonding surface is formed with the reflective polarizing sheet to be bonded, so that the reflective polarizing sheet and the light-condensing sheet can stably maintain the bonding state.

However, since the upper end portion of the light-condensing sheet is eliminated due to the bonding with the reflective polarizing sheet as described above, the inclined plane is eliminated at a portion where the bonding surface is formed, so that the efficiency of the light-condensing sheet for condensing the light transmitted from below is reduced.

Particularly, when light is transmitted through the bonding surface where the reflective polarizing sheet and the prism are bonded, a bonding surface line is visually observed, or a color shift occurs due to the optical interference phenomenon of the reflective polarizing sheet composed of a multilayer thin film. Accordingly, there is a problem that a screen quality is deteriorated.

In addition, an unintentional moire phenomenon due to optical interference with a liquid crystal panel may be caused by the bonding surface line having a specific pattern.

DISCLOSURE

Technical Problem

The present invention has been made in view of the above problems, and provides a reflective polarizing module provided with a separate coating layer having a diffusing pattern on a reflective polarizing sheet so as to diffuse light transmitted through the reflective polarizing sheet so that a bonding line with a prism is not generated, and having the diffusion pattern for preventing a moire phenomenon caused by the bonding line, and a backlight unit having the same.

The present invention further provides a reflective polarizing module which can prevent brightness from being lowered by minimizing a portion where the upper end of the 434 prism is eliminated by the bonding with a lower surface of the reflective polarizing sheet, and a backlight unit having the same.

The present invention is not limited to the above-described technical subject, and other technical subjects not mentioned may be clearly understood by those skilled in the art from the following description.

Technical Solution

In an aspect, there is provided a reflective polarizing module, including: a reflective polarizing sheet having a plurality of layers with different refractive indices stacked one above another to selectively transmit light; a first light-condensing sheet having a first structuralized pattern in which first unit light-condensing bodies are continuously repeated, wherein each of the first unit light-condensing bodies has an upwardly gradually decreasing transverse cross-sectional area, and an upper end of the first unit light-condensing body is bonded to a lower portion of the reflective polarizing sheet so as to have a first width along a traverse direction; and a coating layer located on an upper surface of the reflective polarizing sheet and having a diffusion pattern formed on an upper surface thereof to diffuse light transmitted through the reflective polarizing sheet, the diffusion pattern being constituted by a plurality of diffusion protrusions protruding from the upper surface of the coating layer, wherein at least some of the plurality of diffusion protrusions are formed to have a transverse width relatively smaller than the first width.

The diffusion protrusion has a non-uniform size and is formed on the upper surface of the coating layer.

The reflective polarizing module further includes a bonding layer which is located on a lower surface of the reflective polarizing sheet and is embedded and bonded so that the upper end of the first unit light-condensing body has a boundary surface of a second width in a transverse direction, wherein at least some of the plurality of diffusion protrusions are formed to have a transverse width relatively smaller than the second width.

The bonding layer has a plurality of non-uniform bonding patterns and is located on the lower surface of the reflective polarizing sheet.

A length of a transverse width of the bonding pattern formed on the bonding layer is relatively smaller than the first width.

The first light-condensing sheet has a non-uniform vertical distance ranging from a lowermost end to an uppermost end of the first unit light-condensing body.

The first structuralized pattern is formed in such a manner that the first unit light-condensing bodies are extended lengthways and repeatedly formed and a height is changed along an extension direction.

In another aspect, there is provided a back light unit, including: a light guide plate having a light source at one side thereof and transmitting light generated from the light source downwardly; a reflector which is stacked on a lower surface of the light guide plate and reflects light transmitted through the light guide plate upwardly; an optical module comprising a diffusion sheet stacked on an upper portion of the light guide plate to diffuse light transmitted from below and a second light-condensing sheet having a second structuralized pattern which is coupled to an upper portion of the diffusion sheet, and in which second unit light-condensing bodies are continuously repeated, wherein each of the second unit light-condensing bodies has an upwardly gradually decreasing transverse cross-sectional area; and a reflective polarizing module comprising a reflective polarizing sheet having a plurality of layers with different refractive indices stacked one above another to selectively transmit light, a first light-condensing sheet having a first structuralized pattern in which first unit light-condensing bodies are continuously repeated, wherein each of the first unit light-condensing bodies has an upwardly gradually decreasing transverse cross-sectional area, and an upper end of the first unit light-condensing body is bonded to a lower portion of the reflective polarizing sheet so as to have a first width along a traverse direction, and a coating layer located on an upper surface of the reflective polarizing sheet and having a diffusion pattern formed on an upper surface thereof to diffuse light transmitted through the reflective polarizing sheet, the diffusion pattern being constituted by a plurality of diffusion protrusions protruding from the upper surface of the coating layer, wherein at least some of the plurality of diffusion protrusions are formed to have a transverse width relatively smaller than the first width.

Advantageous Effects

In order to solve the above problems, the present invention has the following effects.

First, a coating layer having a separate diffusing pattern is provided on the upper surface of a reflective polarizing sheet to diffuse the light passing through the reflective polarizing sheet, thereby reducing a moire phenomenon generated by a periodic pattern formed by the bonding surface of the reflective polarizing sheet and a light-condensing sheet.

Secondly, the color of the light transmitted through the reflective polarizing sheet can be prevented from being shifted.

Third, a coating layer having a diffusion pattern is provided on the upper portion of the reflective polarizing sheet, and light is diffused by the diffusion pattern, thereby preventing the reduction of a light-condensing efficiency due to the bonding surface that is generated as an end portion of a structuralized pattern is eliminated when the reflective polarizing sheet and the structuralized pattern formed on the light-condensing sheet are bonded.

The effects of the present invention are not limited to the effects mentioned above, and other effects not mentioned can be clearly understood by those skilled in the art from the description of the claims.

MODE FOR INVENTION

Figure 1:
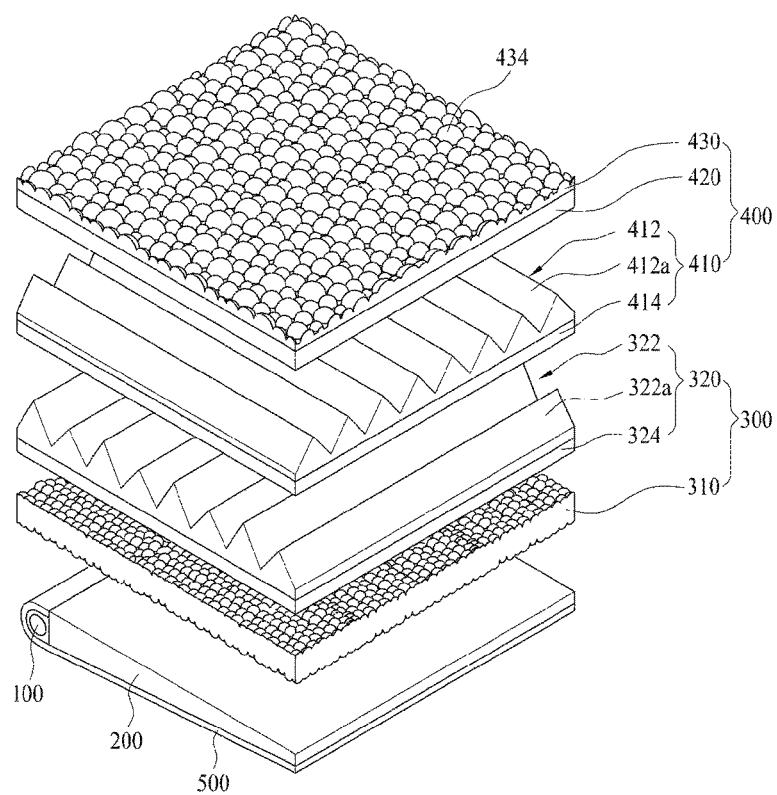
FIG. 1 is an exploded perspective view schematically showing a configuration of a backlight unit having a reflective polarizing module according to the present invention.

Hereinafter, preferred embodiments of the present invention will be described with reference to the accompanying drawings. In describing the present embodiment, the same designations and the same reference numerals are used for the same components, and further description thereof will be omitted.

In the following description, it is illustrated that a backlight unit having a reflective polarizing module according to an embodiment of the present invention is applied to a flat panel liquid crystal display such as an LCD or an LED panel. However, the present invention is not limited thereto, and an optical sheet may be used alone. Alternatively, the present invention may be a backlight unit applied to a mechanism other than that applied to a liquid crystal display, or may be applied to any apparatus such as a lighting device that changes the characteristics and path of light.

<Configuration>

First, referring to FIG. 1 to FIG. 4, a schematic configuration of a backlight unit to which a reflective polarizing module according to an embodiment of the present invention is applied will be described.

Figure 2:
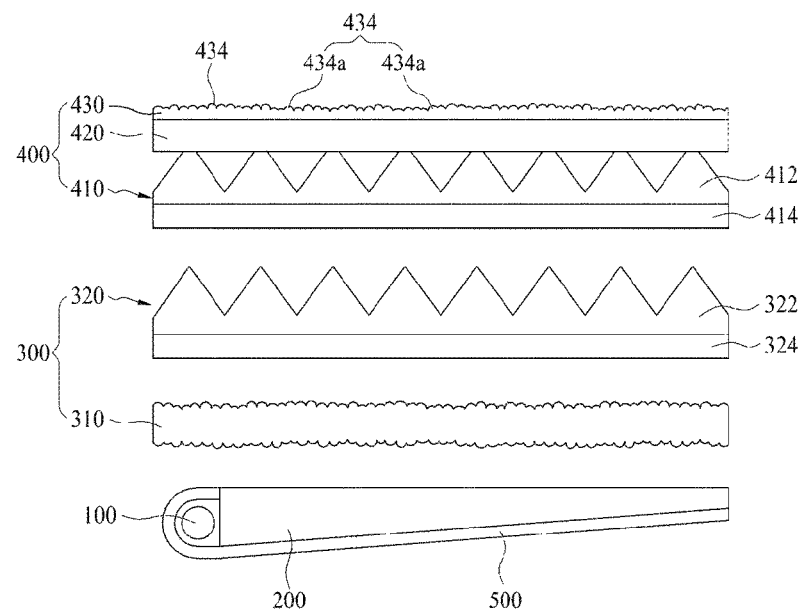
FIG. 2 is a schematic view showing a configuration of a reflective polarizing module and an optical module in the backlight unit of FIG. 1.

FIG. 1 is an exploded perspective view schematically showing a configuration of a backlight unit having a reflective polarizing module according to the present invention, and FIG. 2 is a schematic view showing a configuration of a reflective polarizing module and an optical module in the backlight unit of FIG. 1.

Figure 3:
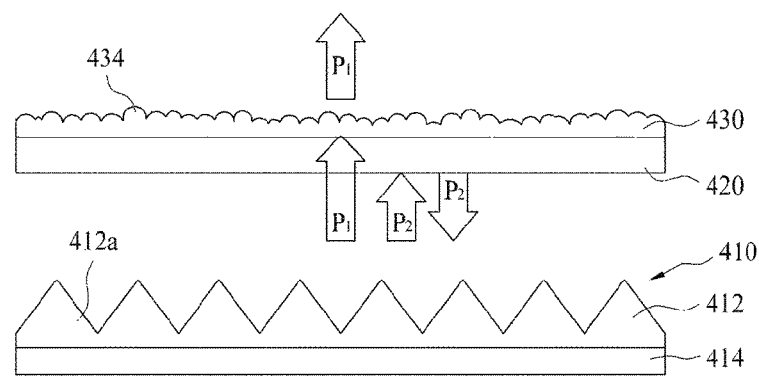
FIG. 3 is a view showing that a reflective polarizing sheet in the backlight unit of FIG. 1 transmits and reflects light.
Figure 4:
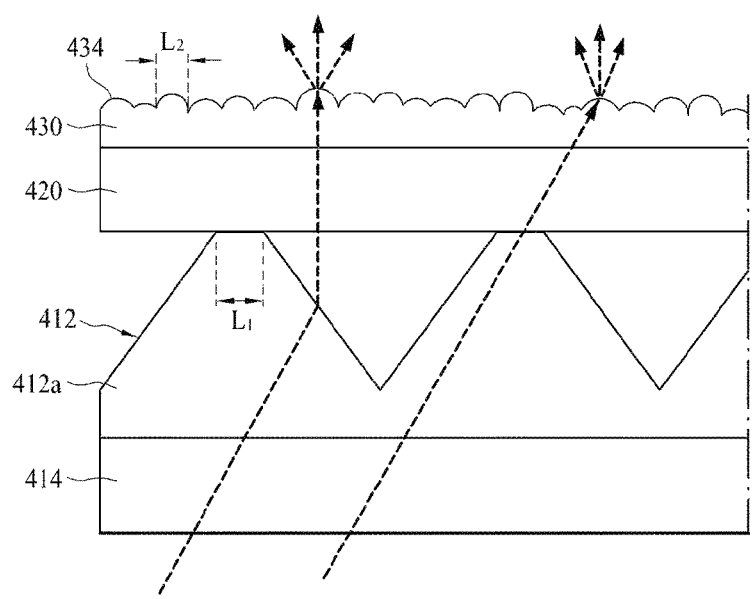
FIG. 4 is a view showing a state where a diffusion pattern formed on a coating layer in the reflective polarizing sheet of FIG. 1 is formed to be relatively smaller than a first width of first unit light-condensing bodies.

FIG. 3 is a view showing that a reflective polarizing sheet in the backlight unit of FIG. 1 transmits and reflects incident light, and FIG. 4 is a view showing that a diffusion protrusion 434a inside a coating layer in the reflective polarizing sheet of FIG. 1 is formed to be relatively smaller than a first width of first unit light-condensing bodies.

As shown in FIG. 1, a backlight unit (BLU) for providing light to a liquid crystal panel must be provided in a liquid crystal display. Such a backlight unit may include a light source 100, a light guide plate 200, a reflector 500, an optical module 300, and a reflective polarizing module 400.

The light source 100 may generally generate light at the side of the light guide plate 200 and transmits light toward the light guide plate 200. As the light source 100, a light emitting diode (LED) and a cold cathode fluorescent lamp (CCFL) may be selectively used.

The light incident on the light guide plate 200 may travel while causing total reflection in the light guide plate 200. The light incident on the surface of the light guide plate 200 at an incident angle smaller than a critical angle may be emitted upwardly and downwardly as it is transmitted without being totally reflected. At this time, the reflector 500 may reflect the light emitted downwardly to re-inject into the light guide plate 200 to improve light efficiency. Through this process, the light guide plate 200 may transmit the incident light toward the optical module 300.

The light guide plate 200 may transmit the light transmitted from the light source 100 toward the optical module 300.

A reflector 500 may be disposed on a lower surface of the light guide plate 200 to reflect upwardly the light emitted to a lower surface and a side surface of the light source.

The light guide plate 200 and the reflector 500 may be stacked and provided with the light source 100 on the side thereof. The light emitted from the light source 100 may be reflected by the light guide plate 200 and the reflector 500, so that light can be stably transmitted to the optical module 300 and the reflective polarization module 400 even if the light source 100 is provided on the side.

The optical module 300 may be disposed in the upper portion of the light guide plate 200 to diffuse the light transmitted from the light guide plate 200 and the reflector 500, and may condense the diffused light to transmit the condensed light upwardly. The optical module 300 may include a diffusion sheet 310 and a second light-condensing sheet 320.

The diffusion sheet 310 may be disposed in the upper portion of the light guide plate 200 to diffuse the light and uniformly transmit the light to the second light-condensing sheet 320.

Specifically, the diffusion sheet 310 may uniformly diffuse the light transmitted upwardly through the light guide plate 200 and the reflector 500 provided in the lower portion thereof, and transmit the light to the second light-condensing sheet 320 located in the upper portion. A non-uniform diffusion pattern may be formed on the upper surface or the lower surface to diffuse the light.

The second light-condensing sheet 320 has a second structuralized pattern 322 which is coupled to the upper portion of the diffusion sheet 310, and in which second unit light-condensing bodies 322a are continuously repeated, wherein each of the second unit light-condensing bodies has an upwardly gradually decreasing transverse cross-sectional area.

In the present invention, the second light-condensing sheet 320 may mainly include a second base film 324 and a second structuralized pattern 322.

The second base film 324 may be generally made of a light transmissive film so that light incident from below can be easily transmitted. The second structuralized pattern 322 for refracting and condensing the incident light may be formed on the upper surface of the second base film 324 so as to be integrated with the second base film 324.

The second structuralized pattern 322 is formed of a plurality of the second unit light-condensing bodies 322a which are continuously repeated on the upper surface of the second base film 324 and protruded upward, and in which an inclined surface having an upwardly gradually decreasing transverse cross-sectional area is formed.

The second unit light-condensing bodies 322a may refract and condense light transmitted through the second base film 324 and transmit the light upwardly.

Here, the second structuralized pattern 322 may include a plurality of prism shapes formed in such a manner that upper and lower sections of a triangular shape are extended in one direction.

At this time, a plurality of the second unit light-condensing bodies 322a may be provided to have the same size and shape respectively, but may be configured to have a different size and a different inclination angle respectively.

In addition, the second unit light-condensing bodies 322a may have a polygonal sectional shape in the vertical direction so that double inclined plane may be implemented to have a different inclination angle respectively.

In present embodiment, the second unit light-condensing bodies 322a may be formed to extend in one direction along the upper surface of the second light-condensing sheet 320, and a plurality of the second unit light-condensing bodies 322a may be continuously disposed.

As described above, the optical module 300 may include the diffusion sheet 310 which diffuses the light transmitted through the light guide plate 200 and the reflector 500, and the second light-condensing sheet 320 which is disposed on the diffusion sheet 310 and condenses the diffused light to transmit upwardly, thereby condensing and transmitting upwardly the light transmitted from below.

Meanwhile, the reflection polarizing module 400 may be stacked on the upper portion of the optical module 300, and may be configured to condense and polarize the light transmitted from below to uniformly transmit light upwardly. The present invention may mainly include a reflective polarizing sheet 420, a first light-condensing sheet 410, and a coating layer 430.

The reflective polarizing sheet 420 may be configured to transmit only the light of a specific polarization among the light condensed and transmitted by the optical module 300 and reflect the remaining light downwardly, and may be stacked on and coupled to the upper portion of the optical module 300.

Generally, the reflective polarizing sheet 420 may be a stack of multilayer and may be operated as a reflective polarizing plate or a mirror that reflects light of a specific polarization. In addition, it may serve as a wavelength selective reflector, such as a "cold mirror" that reflects visible light and passes infrared light, or a "hot mirror" that passes visible light and reflects infrared light.

The reflective polarizing sheet 420 as used in the present invention may exhibit a high reflectivity with respect to an off-angle as well as a normal ray, and exhibit a low absorptivity with respect to an incident ray. This property may typically determine whether the reflective polarizing sheet 420 is used for a simple reflection of light or a reflective polarization.

The reflective polarizing sheet 420 may be formed by stacking tens, hundreds or thousands of layers of different high refractive index film and low refractive index film.

In the reflective polarizing sheet 420 of the present invention configured as described above, as shown in FIG. 3, the light directed to the reflective polarizing sheet 420 is a light mixed with light of different polarizations formed of the light of P1 having the polarization of area which is transmitted through the reflective polarizing sheet 420, and the light of P2 having the polarization of area which is not transmitted through the reflective polarizing sheet 420.

As shown, the light passing through the first and second light-condensing sheets 410 and 320 is in a mixed state of P1 and P2, but the reflective polarizing sheet 420 may transmit only P1 light and may reflect the light of P2 downwardly.

Therefore, the light of P1 may be emitted to the outside, but the light of P2 may be reflected to return downwardly and then reflected again by the first light-condensing sheet 410, the second light-condensing sheet 320, the light guide plate 200, and the reflector 500 to move upwardly. Through this process, the polarization state of the light P2 may be changed and, through repetition of such a process, may be converted to a state suitable for transmission by the reflective polarizing sheet 420.

Thus, the coating layer 430 according to the present invention may be disposed on the upper surface of the reflective polarizing sheet 420 and diffuse the light transmitted through the reflective polarizing sheet 420. A diffusion pattern 434 having a plurality of diffusion protrusions 434a may be formed on the upper surface of the coating layer 430.

The diffusion pattern 434 may be formed of a plurality of the diffusion protrusions 434a on the upper surface of the coating layer 430 and may be non-uniformly disposed in various sizes and shapes. Here, the diffusion pattern 434 may be formed to have a different material or different refractive index from the coating layer 430.

Thus, the light transmitted through the reflective polarizing sheet 420 may be stably diffused.

In the present embodiment, the diffusion protrusion 434a may be formed in a spherical shape and a part of the diffusion protrusion 434a may be embedded into the coating layer 430. The diffusion protrusion 434a may reflect or refract light at various angles through a spherical surface to diffuse the light transmitted through the reflective polarizing sheet 420.

Alternatively, the diffusion protrusions 434a may be formed in various shapes of polygon or asymmetric shape instead of the spherical shape.

Meanwhile, the first light-condensing sheet 410 may include a first structuralized pattern 412 in which first unit light-condensing bodies 412a whose cross-sectional area gradually decreases when progressing upwardly is continuously repeated, and may be disposed on the upper surface of the sheet 320.

In addition, the first light-condensing sheet 410 may condense again the light condensed and transmitted by the second light-condensing sheet 320 to transmit upwardly.

At this time, the first unit light-condensing bodies 412a may be formed in the same manner as the second unit light-condensing bodies 322a, or may be formed differently from the second unit light-condensing bodies 322a.

The first light-condensing sheet 410 in the present invention may include a first base film 414 and the first structuralized pattern 412 similarly to the second light-condensing sheet 320 described above.

Here, the first structuralized pattern 412 may be disposed below the reflective polarizing sheet 420 and may be formed on the upper surface of the first base film 414.

In addition, the first base film 414 and the second base film 324 may be made of acryl or urethane, and may be preferably made of a material having a high light transmittance so as to transmit the light transmitted from the diffusion sheet 310.

The first light-condensing sheet 410 formed described above may be stacked under the reflective polarizing sheet 420. At least a part of the first unit condensing bodies 412a may be bonded to the reflective polarizing sheet 420.

Accordingly, the first light-condensing sheet 410 and the reflective polarizing sheet 420 may be stably bonded while maintaining an adhered state.

Meanwhile, in the present embodiment, each of the first structuralized pattern 412 and the second structuralized pattern 322 may be formed to extend along the traverse direction, and the extending direction of the first structuralized pattern 412 may be disposed in a direction intersecting the extending direction of the second structuralized pattern 322.

In the present embodiment, the extending directions of the first structuralized pattern 412 and the second structuralized pattern 322 may be disposed perpendicularly to each other. Alternatively, the extending directions of the first structuralized pattern 412 and the second structuralized pattern 322 may be disposed not to be perpendicular but simply to intersect with each other.

Accordingly, the light diffused in the diffusion sheet 310 and transmitted upwardly may be stably condensed via the first unit light-condensing bodies 412a and the second unit light-condensing bodies 322a.

Meanwhile, the first light-condensing sheet 410 according to the present invention may be bonded in such a manner that an upper end of the first structuralized pattern 412 has a first width along the traverse direction under the reflective polarizing sheet 420.

Specifically, the first unit light-condensing bodies 412a may be bonded to the lower surface of the reflective polarizing sheet 420, and a part of the upper end of the first unit light-condensing bodies 412a may be eliminated to bond at the time of bonding.

At this time, a width of the upper end of the first unit light-condensing bodies 412a along the traverse direction may be configured to have a first width.

That is, after the first unit light-condensing bodies 412a may be bonded to the lower surface of the reflective polarizing sheet 420, the transverse length of the bonded portion may be set to become the first width.

In the present embodiment, as shown in the drawing, the first unit light-condensing bodies 412a may be directly bonded to the lower surface of the reflective polarizing sheet 420. At the time of bonding, the upper end of the first unit light-condensing bodies 412a may be eliminated and serve as an adhesive. At this time, the first width of a portion bonded to the lower surface of the reflective polarizing sheet 420 may become L1.

In addition, the plurality of diffusion protrusions 434a formed on the upper surface of the coating layer 430 may be formed in such a manner that a length of at least a part of the diffusion protrusions 434a is smaller than the first width. In the diffusion pattern 434 of the present embodiment, as shown, the maximum length of the diffusion protrusion 434a along the traverse direction may be L2 which is relatively smaller than the first width L1.

Here, the diffusion protrusion 434a may be a result of diffusing diffusion particles such as beads into polymer resin, or a part of the diffusion particles may be embedded into the polymer resin and only the remaining part may be exposed.

Further, the diffusion protrusion 434a may be formed by a method of duplicating using a master, or may be formed using a separate processing roll.

The maximum diameter of the diffusion protrusion 434a may be relatively smaller than the first width L1. Thus, the light transmitted through the first unit light-condensing bodies 412a and transmitted to the reflective polarizing sheet 420 may be refracted upwardly in the diffusing protrusion 434a, thereby preventing the brightness from being reduced.

Specifically, when the maximum diameter L2 of the diffusion protrusion 434a is larger than the first width L1, the angle of light refracted by the first unit light-condensing bodies 412a may be refracted at a larger angle by the diffusion protrusion 434a so that the light is refracted to the side other than the center.

Accordingly, the brightness of light passing through the coating layer 430 may be reduced overall.

However, as in the present invention, since the maximum diameter L2 of the diffusion protrusions 434a is smaller than L1 which is the first width, the light which is refracted and transmitted by the first unit light-condensing bodies 412a may be diffused upwardly by the diffusion protrusions 434a.

Accordingly, the light passing through the coating layer 430 by the diffusion protrusion 434a may minimize the brightness degradation while generating an internal diffusion so that it is possible to prevent the quality degradation of the backlight unit such as a moire phenomenon caused by the bonding surface of the first unit light-condensing bodies 412a and the reflective polarizing sheet 420.

That is, the coating layer 430 may have the diffusion pattern 434 on the upper surface thereof and may be formed on the upper surface of the reflective polarizing sheet 420, and the diameter of the diffusion protrusion 434a may be formed to be smaller than the first width, so that it is possible to prevent the light passing through the coating layer 432 from diffusing to the side other than the center, thereby preventing the brightness from being reduced.

The backlight unit of the present invention may be stacked and coupled in the order of the reflector 500, the light guide plate 200, the optical module 300, and the reflective polarizing module 400, and may diffuse and condense the light generated from the light source 100. The light passed through the reflective polarizing sheet 420 may be diffused to the central by the diffusion pattern 434.

<Effect>

Meanwhile, as the diffusion pattern 434 is provided on the coating layer 430 as described above, the light passed through the first light-condensing sheet 410 and the reflective polarizing sheet 420 may be diffused at a certain angle, thereby shielding a defect which is a problem in the quality deterioration of the bonding line or the like.

Generally, as the first light-condensing sheet 410 and the reflective polarizing sheet 420 are bonded to each other, a part of the upper end of the first unit light-condensing bodies 412a may be lost, and accordingly, a portion where light is not condensed may be generated as an inclined surface which refracts the light transmitted from below does not exist.

Thus, moire phenomenon, color shift, and shading due to bonding line may occur in a liquid crystal display using a backlight unit, thereby deteriorating display quality.

However, in the reflective polarizing module 400 according to the present invention, since the coating layer 430 on which the diffusion pattern 434 is formed is placed on the upper surface of the reflective polarizing sheet 420, the diffusion protrusion 434a together with the first light-condensing sheet 410 may condense and diffuse the light transmitted from below at a certain angle.

That is, even if the light transmitted from the optical module 300 is partially not condensed due to the bonding surface generated by the bonding of the first unit light-condensing bodies 412a and the lower surface of reflective polarizing sheet 420, the light may be diffused by the diffusion pattern 434 provided in the coating layer 430, thereby preventing the reduction of the brightness of the backlight unit.

In addition, since the diffusion pattern 434 is provided on the coating layer 430, the light passing through the coating layer 432 may be prevented from diffusing to the side other than the center, thereby preventing the brightness from being reduced.

As described above, it is preferable that the length of the width of the diffusion protrusion 434a, along the traverse direction, having the maximum size among the plurality of diffusion protrusions 434a is formed to be smaller than the first width. Thus, light can be stably diffused so that the shading due to the bonding surface may not be generated through the first unit light-condensing bodies 412a and the reflective polarizing sheet 420.

As described above, since the width of the diffusion protrusions 434a along the traverse direction is smaller than the first width L1, at least one or more of the diffusion protrusions 434a may be disposed on the upper portion of the bonding surface of the first unit light-condensing bodies 412a and the reflective polarizing sheet 420, thereby stably diffusing light.

Obviously, the diffusion protrusions 434a may be formed to have a relatively smaller diameter than the first width and may have various sizes, and the brightness of the diffusion protrusion 434a may be adjusted by adjusting the size of the diffusion layer 434a when the coating layer 430 is manufactured.

As described above, the diffusion pattern 434 may be formed on the coating layer 430 and may have a width along the traverse direction that is relatively smaller than the first width, so that it is possible to diffuse the light which is not condensed by the bonding surface of the reflective polarizing sheet 420 in the first light-condensing sheet 410. Accordingly, it is possible to prevent a moire phenomenon in which a stripe, etc is generated in the liquid crystal display or a color shift phenomenon by diffusing the light passed through the first light-condensing sheet 410 and the reflective polarizing sheet 420 at a certain angle.

In addition, the coating layer 430 having the diffusion pattern 434 provided on the upper portion of the reflective polarizing sheet 420 may be provided so that light is diffused by the diffusion pattern 434. Thus, it is possible to prevent the reduction of the light-condensing efficiency due to the bonding surface that is generated as the end portion of the first structuralized pattern 412 is eliminated when the reflective polarizing sheet 420 and the first structuralized pattern 412 formed on the first light-condensing sheet 410 are bonded.

<Modifications>

Next, referring to FIGS. 5 to 7, a state where a separate bonding layer 440 is further included in the reflective polarizing module 400 according to the present invention will be described.

Figure 5:
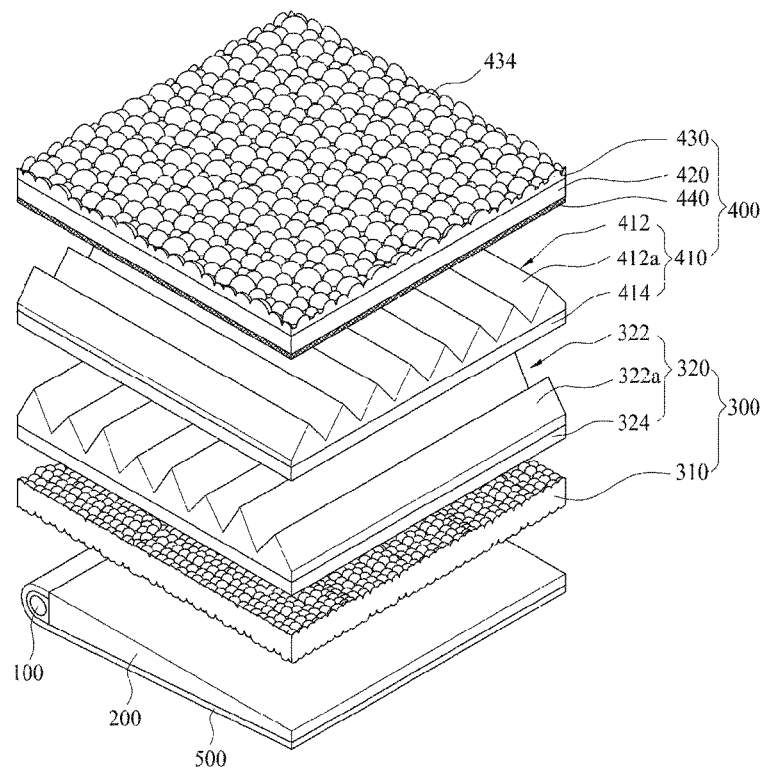
FIG. 5 is a view illustrating a state where a separate bonding layer is formed on a lower surface of the reflective polarizing sheet in the backlight unit of FIG. 1.
Figure 6:
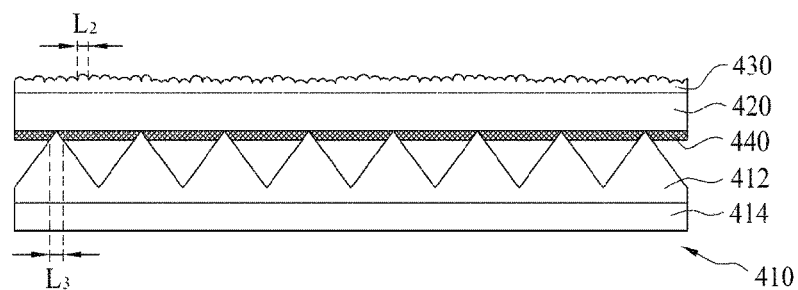
FIG. 6 shows a side view of the reflective polarizing module of FIG. 5.
Figure 7:
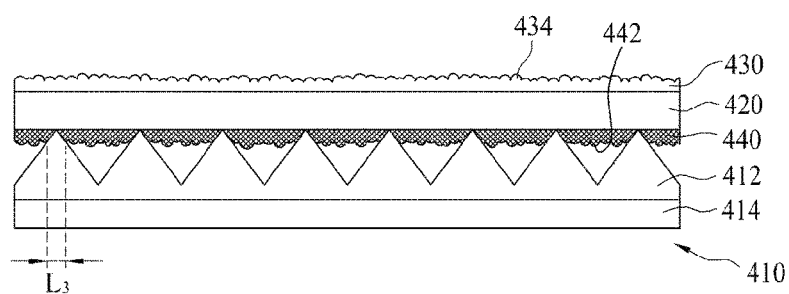
FIG. 7 is a view showing a state where a separate bonding pattern is formed on a bonding layer formed on a lower surface of the reflective polarizing sheet of FIG. 5.

FIG. 5 is a view illustrating a state where a separate bonding layer 440 is formed on a lower surface of the reflective polarizing sheet 420 in the backlight unit of FIG. 1, FIG. 6 shows a side view of the reflective polarizing module 400 of FIG. 5, and FIG. 7 is a view showing a state where a separate bonding pattern 442 is formed on the bonding layer 440 formed on a lower surface of the reflective polarizing sheet 420 of FIG. 5.

Referring to FIGS. 5 and 6, it is illustrated that a separate bonding layer 440 is further included in the backlight unit of the present invention. The coating layer 430 is formed on the upper surface of the reflective polarizing sheet 420 while the bonding layer 440 is formed on the lower surface of the reflective polarizing sheet 420.

Specifically, the bonding layer 440 may be partially or wholly located on the lower surface of the reflective polarizing sheet 420, and may have a uniform thickness or a non-uniform thickness.

In the present embodiment, the bonding layer 440 may be provided on the lower surface of the reflective polarizing sheet 420 to have a uniform thickness and the upper end of the first structuralized pattern 412 formed on the first light-condensing sheet 410 may be embedded into the bonding layer 440.

Here, it is preferable that the upper end of the first unit light-condensing bodies 412a embedded into the bonding layer 440 located on the lower surface of the reflective polarizing sheet 420 is embedded to have the bonding surface of the second width in the transverse direction with the bonding layer 440.

That is, when the first unit light-condensing bodies 412a is embedded into the bonding layer 440, the transverse length of the embedded portion may become the second width L3, and thus, may be formed to be smaller than the width L2 of the diffusion protrusion 434a along the transverse direction formed on the upper surface of the coating layer 430.

Accordingly, even if the bonding surface occurs due to the first unit light-condensing bodies 412a embedded into the bonding layer 440, the light transmitted from below may be diffused by the diffusion pattern 434.

As described above, since the bonding layer 440 is further included in the reflective polarizing module 400, the bonding area between the first light-condensing sheet 410 and the reflective polarizing sheet 420 may be increased to increase bonding strength, thereby more stably maintaining the bonding state between the first light-condensing sheet 410 and the reflective polarizing sheet 420.

The bonding layer 440 may be made of the same material as that of the first light-condensing sheet 410 or may be made of a material having a different refractive index.

Meanwhile, on the other hand, referring to FIG. 7, a plurality of non-uniform bonding patterns 442 may be further formed on the bonding layer 440.

Here, like the above-mentioned diffusion pattern 434, the bonding pattern 442 may be formed to have a plurality of protrusions protruding downwardly, and the length of the width along the traverse direction of each protrusion may be relatively smaller than L1 which is the first width.

As the bonding pattern 442 is formed on the bonding layer 440, even if the bonding surface is generated by the portion in which the first unit light-condensing bodies 412a is embedded as mentioned above, the light transmitted from below may be diffused by the diffusion pattern 434. At the same time, as only a part of the first unit light-condensing bodies 412a is embedded in the bonding layer 440, the elimination of the inclined plane can be minimized, thereby increasing a light-condensing effect.

Next, a modified form of the first structuralized pattern 412 in the reflective polarizing module 400 according to the present invention will be described with reference to FIGS. 8 and 9.

Figure 8:
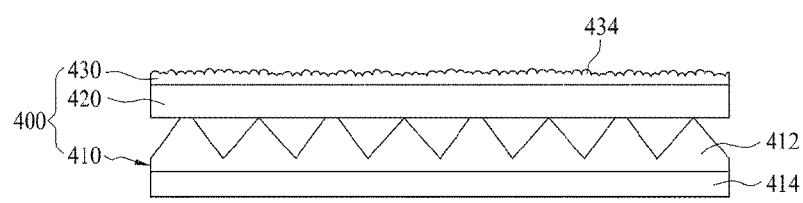
FIG. 8 is a view illustrating a state where a vertical height of first unit light-condensing bodies are unevenly formed in the reflective polarizing module of FIG. 1.

FIG. 8 is a view illustrating a state where a vertical height of the first unit light-condensing bodies are unevenly formed in the reflective polarizing module 400 of FIG. 1, and FIG. is a view showing a shape in which a height of each of the first unit light-condensing bodies according to an extension direction is changed in the reflective polarizing module of FIG. 1.

Referring to FIG. 8, a plurality of the first unit light-condensing bodies 412a may be disposed apart from each other along the upper surface of the first base film 414, unlike the above. Here, although not shown, each of the plurality of the first unit light-condensing bodies 412a may be extended lengthways along the upper surface of the first base film 414 and may be spaced apart from one another.

At this time, as shown in the drawing, the plurality of the first unit light-condensing bodies 412a may be configured in such a manner that vertical distances from the lowermost end to the uppermost end are non-uniform.

As described above, since the plurality of the first unit light-condensing bodies 412a have a non-uniform height in a vertical direction, when the first base film 414 and the reflective polarizing sheet 420 are bonded to each other, only a part of the plurality of the first unit light-condensing bodies 412a may be bonded to the reflective polarizing sheet 420, and the remainder may not be bonded.

Since only a part of the first unit light-condensing bodies 412a is bonded to the lower surface of the reflective polarizing sheet 420 as described above, the elimination of the inclined plane in the first light-condensing sheet 410 may be reduced, thereby minimizing the reduction of the light condensing effect of the light transmitted from the optical module 300.

Figure 9:
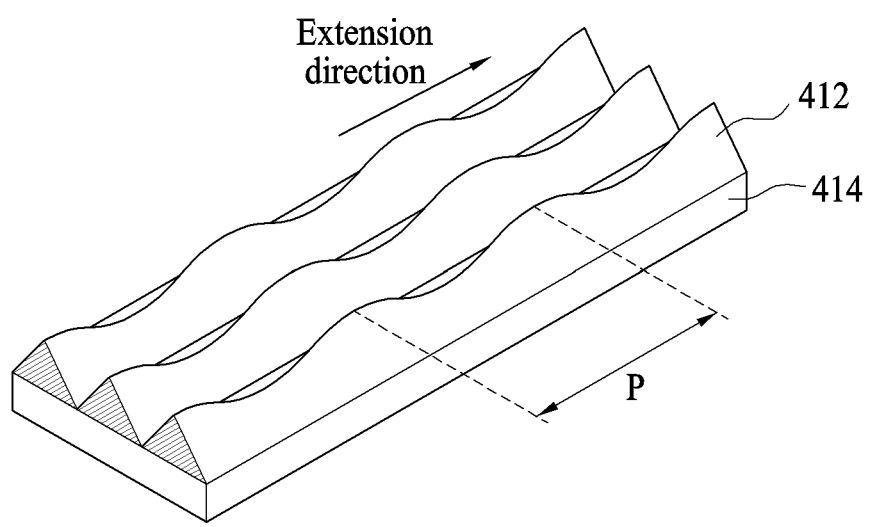
FIG. 9 is a view showing a shape in which a height of each of first unit light-condensing bodies according to an extension direction is changed in the reflective polarizing module of FIG. 1.

Referring to FIG. 9, the first unit light-condensing bodies 412a may be deformed on the upper surface of the first base film 414, and a plurality of the first unit light-condensing bodies 412a may be extended lengthways along the upper surface of the base film 414, and each of the plurality of the first unit light-condensing bodies 412a may be repeatedly disposed along the traverse direction.

At this time, the plurality of the first unit light-condensing bodies 412a may be formed to be not uniform in height along the extension direction, and only a part thereof may be bonded to the lower surface of the reflective polarizing sheet 420.

That is, the plurality of the first unit light-condensing bodies 412a may have a uniform pattern and may be uniformly spaced from each other, and each of the first unit light-condensing bodies 412a may be formed to have a non-uniform height along the extension direction. Thus, in a single first unit light-condensing body 412a, only a part thereof may be bonded to the lower surface of the reflective polarizing sheet 420.

At this time, the height of each of the first unit light-condensing bodies 412a may be changed with a constant period P, but the height may be changed irregularly along the extension direction.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A reflective polarizing module comprising:
a reflective polarizing sheet having a plurality of layers with different refractive indices stacked one above another to selectively transmit light;
a first light-condensing sheet having a first structuralized pattern in which first unit light-condensing bodies are continuously repeated, wherein each of the first unit light-condensing bodies has an upwardly gradually decreasing transverse cross-sectional area, and an upper end of each of the first unit light-condensing bodies is bonded to a lower portion of the reflective polarizing sheet so as to have a first width along a traverse direction; and
a coating layer located on an upper surface of the reflective polarizing sheet and having a diffusion pattern formed on an upper surface thereof to diffuse light transmitted through the reflective polarizing sheet, the diffusion pattern having a plurality of diffusion protrusions protruding from the upper surface of the coating layer,
wherein at least two of the plurality of diffusion protrusions are respectively formed to have a transverse width relatively smaller than the first width.

2. The reflective polarizing module of claim 1, wherein the diffusion protrusion has a non-uniform size and is formed on the upper surface of the coating layer.

3. The reflective polarizing module of claim 1, further comprising a bonding layer which is located on a lower surface of the reflective polarizing sheet and is embedded and bonded so that the upper end of each of the first unit light-condensing bodies has a boundary surface of a second width in the transverse direction,
wherein at least two of the plurality of diffusion protrusions are respectively formed to have a transverse width relatively smaller than the second width.

4. The reflective polarizing module of claim 3, wherein the bonding layer has a plurality of non-uniform bonding patterns and is located on the lower surface of the reflective polarizing sheet.

5. The reflective polarizing module of claim 4, wherein a length of a transverse width of one of the bonding patterns formed on the bonding layer is relatively smaller than the first width.

6. The reflective polarizing module of claim 1, wherein the first light-condensing sheet has a non-uniform vertical distance ranging from a lowermost end to an uppermost end of each of the first unit light-condensing bodies.

7. The reflective polarizing module of claim 6, wherein the first structuralized pattern is formed in such a manner that the first unit light-condensing bodies are extended lengthways and repeatedly formed and a height of each of the first unit light-condensing bodies is changed along an extension direction.

8. A back light unit comprising:
a light guide plate having a light source at one side thereof and transmitting light generated from the light source downwardly;
a reflector which is stacked on a lower surface of the light guide plate and reflects light transmitted through the light guide plate upwardly;
an optical module comprising a diffusion sheet stacked on an upper portion of the light guide plate to diffuse light transmitted from below and a first light-condensing sheet having a first structuralized pattern which is coupled to an upper portion of the diffusion sheet, and in which first unit light-condensing bodies are continuously repeated, wherein each of the first unit light-condensing bodies has an upwardly gradually decreasing transverse cross-sectional area; and
a reflective polarizing module comprising a reflective polarizing sheet having a plurality of layers with different refractive indices stacked one above another to selectively transmit light, a second light-condensing sheet having a second structuralized pattern in which second unit light-condensing bodies are continuously repeated, wherein each of the second unit light-condensing bodies has an upwardly gradually decreasing transverse cross-sectional area, and an upper end of each of the second unit light-condensing bodies is bonded to a lower portion of the reflective polarizing sheet so as to have a first width along a traverse direction, and a coating layer located on an upper surface of the reflective polarizing sheet and having a diffusion pattern formed on an upper surface thereof to diffuse light transmitted through the reflective polarizing sheet, the diffusion pattern having a plurality of diffusion protrusions protruding from the upper surface of the coating layer,
wherein at least two of the plurality of diffusion protrusions are formed to have a transverse width relatively smaller than the first width.

* * * * *